US012062349B2

(12) United States Patent
Huss et al.

(10) Patent No.: US 12,062,349 B2
(45) Date of Patent: Aug. 13, 2024

(54) ADJUSTING SIGNAL SETTINGS FOR A DISPLAY USING A LIGHT SENSOR

(71) Applicant: Apple Inc., Cupertino, CA (US)

(72) Inventors: Marshall W. Huss, Santa Clara, CA (US); Maxim Stepanov, Palo Alto, CA (US); Manik Kalra, Cupertino, CA (US); Christopher J. Sanders, San Jose, CA (US); Vijay Sundaram, San Ramon, CA (US); Osborn F. de Lima, Santa Clara, CA (US); Shahram Peyvandi, Santa Clara, CA (US); Adria Fores Herranz, Santa Clara, CA (US); Jiaying Wu, San Jose, CA (US); Lu Zhang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 17/881,239

(22) Filed: Aug. 4, 2022

(65) Prior Publication Data

US 2022/0375430 A1 Nov. 24, 2022

Related U.S. Application Data

(63) Continuation of application No. 17/385,733, filed on Jul. 26, 2021, now Pat. No. 11,443,716, which is a
(Continued)

(51) Int. Cl.
*G09G 5/00* (2006.01)
*G09G 3/34* (2006.01)
(Continued)

(52) U.S. Cl.
CPC ............. *G09G 5/10* (2013.01); *G09G 3/3413* (2013.01); *H04M 1/2473* (2013.01);
(Continued)

(58) Field of Classification Search
CPC .................. G09G 5/10; G09G 3/3413; G09G 2320/0666; G09G 2320/0693;
(Continued)

(56) References Cited

U.S. PATENT DOCUMENTS

2015/0317928 A1* 11/2015 Safaee-Rad ............ G09G 3/006
345/593
2015/0317944 A1* 11/2015 Safaee-Rad ............... G06T 1/20
345/595

(Continued)

*Primary Examiner* — Pegeman Karimi
(74) *Attorney, Agent, or Firm* — Invoke

(57) ABSTRACT

In some implementations, a mobile computing device may participate in the calibration of an output signal of a media device. This calibration process includes storing device-specific calibration data which is related to properties of a light sensor of the mobile device. The mobile device then detects of properties of light emitted by the display device during a presentation to obtain sensor values related to light emitted by the display device during the presentation. The calibration process may also ensure that the mobile device is proximate to the display device prior to obtaining the sensor values. The collected sensor values are adjusted using device-specific calibration data stored to the mobile device to normalize the sensor values relative to a baseline. These normalized sensor values are sent to the media device for use in adjusting the output signal based on the normalized sensor values.

20 Claims, 17 Drawing Sheets

Related U.S. Application Data continuation of application No. 16/895,966, filed on Jun. 8, 2020, now Pat. No. 11,100,894.

(51) Int. Cl.
 *G09G 5/10* (2006.01)
 *H04M 1/247* (2021.01)

(52) U.S. Cl.
 CPC ............... *G09G 2320/0666* (2013.01); *G09G 2320/0693* (2013.01); *H04M 2250/06* (2013.01); *H04M 2250/12* (2013.01); *H04M 2250/52* (2013.01); *H04M 2250/64* (2013.01)

(58) Field of Classification Search
 CPC .. G09G 3/2003; G09G 2360/145; G09G 5/00; H04M 1/2473; H04M 2250/06; H04M 2250/12; H04M 2250/52; H04M 2250/64; H04M 1/72412
 See application file for complete search history.

(56) References Cited

U.S. PATENT DOCUMENTS

| | | | |
|---|---|---|---|
| 2017/0084250 A1* | 3/2017 | Jia | ............................ G01J 3/10 |
| 2019/0191153 A1* | 6/2019 | Speigle | .................... G09G 5/10 |
| 2019/0251929 A1 | 8/2019 | Fossati et al. | |

* cited by examiner

ADJUSTING SIGNAL SETTINGS FOR A DISPLAY USING A LIGHT SENSOR

INCORPORATION BY REFERENCE; DISCLAIMER

The following applications are hereby incorporated by reference: application Ser. No. 17/385,733 filed on Jul. 26, 2021; application Ser. No. 16/895,966 filed on Jun. 8, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to using a light sensor to adjust video signal settings of a media playback device.

BACKGROUND

Every display device, when provided with the same input signal, is configured to display the content received through the input signal in its own way based on how the display device was calibrated. Even display devices that are calibrated to adhere to the same standard may have slight variations when presenting visual data. To correct errors in display calibration, a user may be required to perform a manual calibration process on the display device to correct the images presented by the display device, which may be a burdensome and tedious task for the user to perform and may result in the user introducing additional calibration errors.

SUMMARY

In some implementations, a mobile computing device may participate in the calibration of an output signal of a media device. This calibration process includes storing device-specific calibration data which is related to properties of a light sensor of the mobile device. The mobile device then detects properties of light emitted by the display device during a presentation to obtain sensor values related to light emitted by the display device during the presentation. The calibration process may also ensure that the mobile device is close enough to the display device to perform the calibration process prior to obtaining the sensor values. The collected sensor values are adjusted using the device-specific calibration data stored to the mobile device to normalize the sensor values relative to a baseline. These normalized sensor values are sent to the media device for use in adjusting the output signal based on the normalized sensor values.

Particular implementations provide at least the following advantages. A user is able to quickly calibrate a signal from a media device to be displayed on their specific display device by simply positioning a mobile device at an appropriate location in front of the display device. The media device and mobile device will run one or more calibration processes to fine tune the output signal from the media device so that it is shown according to a certain standard on the user's display device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1A:
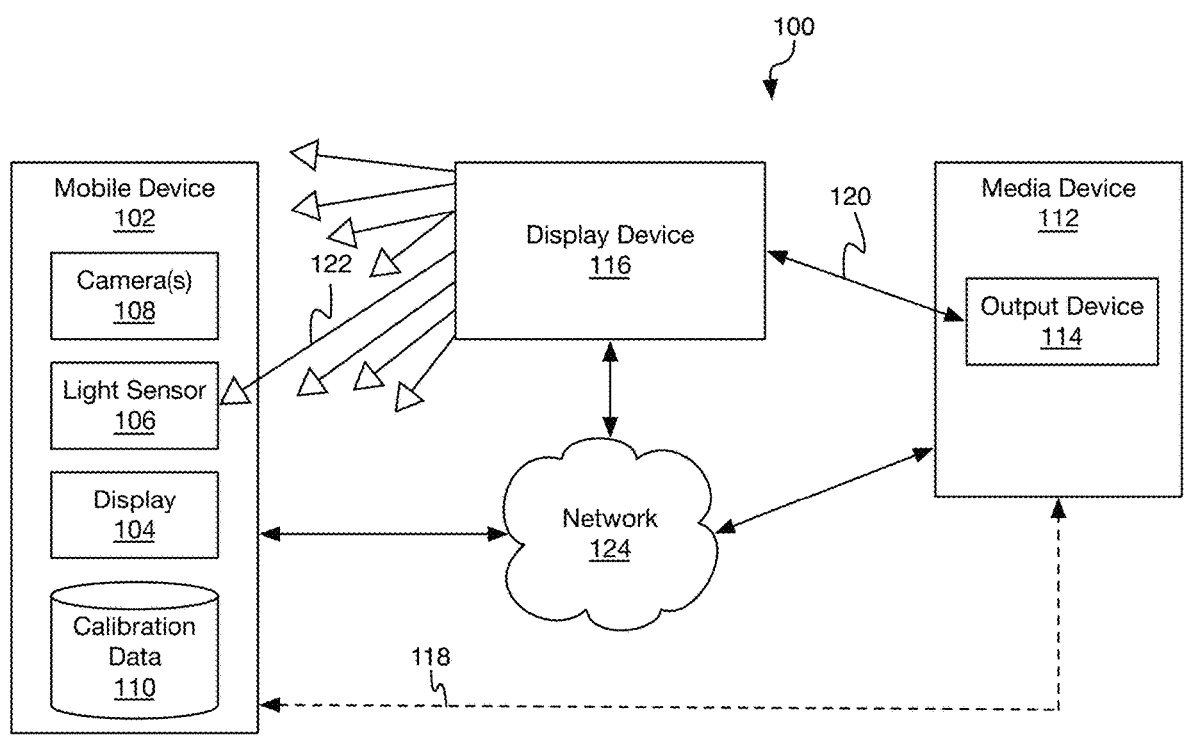
FIG. 1A is a block diagram of an example system for adjusting an output signal to a display device.

FIG. 1A is a block diagram of example system 100 for adjusting an output signal 120 from a media device 112 to a display device 116. System 100 includes a mobile device 102, the media device 112, and the display device 116. In some embodiments, system 100 may include a network 124 for connecting any of the various devices in system 100.

Although network 124 is shown connecting mobile device 102 with media device 112, network 124 may be used to interconnect any number of devices in system 100. Any type of network 124 may be used to interconnect one or more devices in system 100, such as a local area network (LAN), wireless local area network (WLAN), wide area network (WAN), etc.

Mobile device 102 includes at least one light sensor 106 and a memory configured to store calibration data 110. Mobile device 102 may also include a display 104 and at least one camera 108. Display 104 may be of any type, including a touchscreen display. Camera(s) 108 may be of any type and capability.

Light sensor 106 may be any type of light sensor configured to detect one or more properties of light emitted from display device 116, such as a quantity of light, saturation levels of certain colors of light, etc. Some examples of light sensors include, but are not limited to, an ambient light sensor, optical light sensor, photodiode, photoresistor, photoelectric sensor, etc. Light sensor 106 measures properties of light 122 emitted from display device 116 as display device 116 projects one or more known color and/or light presentations to obtain sensor values related to the light 122 emitted by the display device 116.

Calibration data 110 relates to settings and properties of light sensor 106 and allows for readings and measurements obtained by light sensor 106 to be normalized according to a predetermined baseline setting. Calibration data 110 may include settings of mobile device 102 and/or light sensor 106 during an initial calibration procedure performed on light sensor 106, e.g., by a technician, a user, etc.

Light sensor 106 may be calibrated prior to commercial use and/or sale (such as upon production at a factory or shortly thereafter) in order to establish a baseline for the light sensor 106. This factory calibration may include, but is not limited to, adjustments and/or verification to linearity, spectral responsivity, uniformity in response, quantum efficiency, etc. In one approach, a test system may be used to calibrate light sensor 106. The test system may include a tunable light source with one or more light-emitting diodes, which may be turned on and off in sequence while gathering measured responses from light sensor 106. Moreover, numerical optimization techniques may be used to produce final versions of spectral responses for light sensor 106 from the measured responses.

Moreover, one or more subsequent calibration procedures may be performed on light sensor 106, and settings of mobile device 102 and/or light sensor 106 during these subsequent calibration procedures may be included in calibration data 110 and stored to memory of mobile device 102.

Display device 116 may be any device capable of displaying visual data, such as images, photos, videos, streaming content, websites, etc. Some examples of display devices include, but are not limited to, a computer monitor, a touchscreen display, a television, a projector, a laptop or other computer screen, a tablet computer screen, a mobile telephone screen, etc.

Media device 112 includes at least one processor and an output device 114, such as a transmitter module, a receiver and transmitter module Rx/Tx, etc., configured to provide an output signal 120 to be displayed on display device 116. Output signal 120 may be transmitted via a physical connection and/or a wireless connection in various embodiments. In one approach, media device 112 may utilize network 124 to transmit output signal 120 to display device 116. Any type of media device 112 may be included in system 100, such as a set-top box, networked media streaming device, laptop or desktop computer, smart TV, multi-function media console, etc. Output signal 120 includes visual content, and in some embodiments may include audio content. Media device 112 may receive visual content to provide to display device 116 from a particular source (not shown) via any transmission mechanism, such as wireless transmission, hard-wired connection, the Internet, etc.

In one embodiment, an optional connection 118 may be used between media device 112 and mobile device 102. Connection 118 may be hard-wired or wireless, and may be used to transmit data between media device 112 and mobile device 102, such as ques or prompts for starting and/or ending a calibration procedure for the display device 116. Connection 118 may represent a direct, Bluetooth connection between mobile device 102 and media device 112, for example.

In one embodiment, mobile device 102 may be a smartphone having a sensor cluster that includes camera(s) 108 and light sensor 106. In one approach, the sensor cluster may be included on a same side of the smartphone as display 104. When this configuration is used, light contamination may occur due to light being emitted from display 104 of the smartphone reflecting from a surface of display device 116 and back to light sensor 106 when positioned in front of display device 116. To overcome this possible issue, display 104 may be turned off prior to obtaining sensor values from light sensor 106 to avoid the light contamination from display 104 during the calibration procedure.

In another approach, light sensor 106 may be positioned on an opposite side of the smartphone from display 104, with cameras 108 positioned on both sides of the smartphone. In yet another approach, display 104 and light sensor 106 may be positioned on opposite sides of the smartphone, a camera 108 and a light sensor 106 may be positioned on both sides of the smartphone, or in any other conceivable configuration.

In an embodiment, mobile device 102 sends sensor values related to image properties of output signal 120 as displayed on display device 116 to media device 112. Media device 112 then analyzes the sensor values to refine and/or adjust certain display parameters for output signal 120. For example, image properties of the light 122 emitted by display device 116 during display of known image(s) may be analyzed to determine color saturation levels of display device 116 for one or more colors included in displayed image(s).

In an approach, a series of images may be displayed on display device 116, and sensor values relating to image properties of each image may be obtained by light sensor 106 and analyzed by media device 112 and/or mobile device 102 to adjust and/or refine device settings for output signal 120.

In one embodiment, a substantially pure white image may be displayed by display device 116, the white image being configured for testing the white output of display device 116 when displaying output signal 120. Light sensor 106 obtains sensor values for one or more image properties corresponding to the pure white image, and these sensor values may be used to adjust a property of output signal 120, which will cause an adjustment to light displayed by display device 116. In an approach, the sensor values may be used to refine a white point of output signal 120 from media device 112 to display device 116. The white point may be refined to more closely match a selected standard white color, such as D65, D70, etc.

Figure 1B:
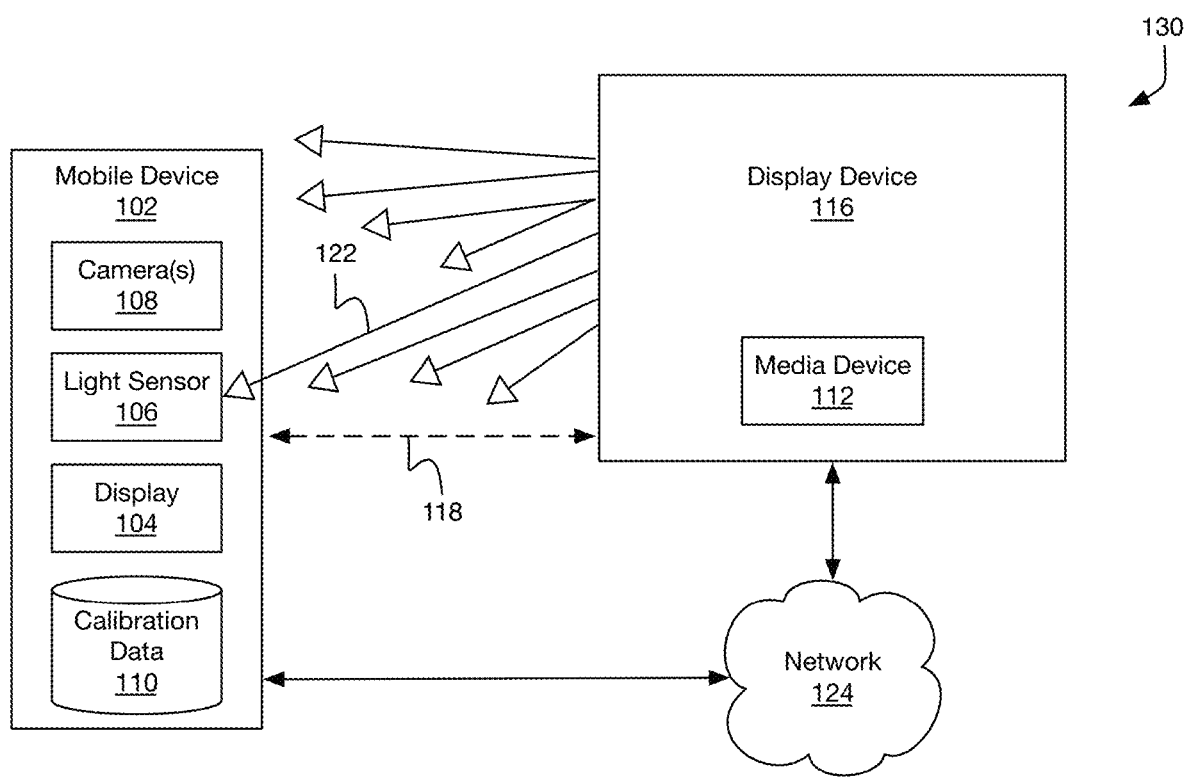
FIG. 1B is a block diagram of another example system for adjusting an output signal to a display device.

FIG. 1B is a block diagram of example system 130 for adjusting an output signal provided to a display device 116. In system 130, display device 116 comprises media device 112 and/or media device 112 is a component of display device 116. In some embodiments, system 130 may include a network 124 for connecting any of the various devices in system 130.

Although network 124 is shown connecting mobile device 102 with display device 116, network 124 may be used to interconnect any number of devices in system 130. Any type of network 124 may be used to interconnect one or more devices in system 130, such as a LAN, WLAN, WAN, etc.

Mobile device 102 includes at least one light sensor 106 and a memory configured to store calibration data 110. Mobile device 102 may also include a display 104 and at least one camera 108. Display 104 may be of any type, including a touchscreen display. Camera(s) 108 may be of any type and capability.

Light sensor 106 may be any type of light sensor configured to detect one or more properties of light 122 emitted from display device 116, such as a quantity of light, saturation levels of certain colors of light, etc. Some examples of light sensors include, but are not limited to, an ambient light sensor, optical light sensor, photodiode, photoresistor, photoelectric sensor, etc. Light sensor 106 measures properties of light 122 emitted from display device 116 as display device 116 projects one or more known color and/or light presentations to obtain sensor values related to the light 122 emitted by the display device 116.

In addition, mobile device may be connected to display device 116 (and/or media device 112) via a direct connection 118, instead of or in addition to the connection via network 124. Connection 118 may represent a direct, Bluetooth connection between mobile device 102 and media device 112, for example.

In this embodiment, media device 112 may receive visual content information from a media source (not shown) and display this visual content on display device 116. In one approach, mobile device 102 may provide sensor values related to image properties of the visual content as displayed on display device 116 to media device 112. Media device 112 then analyzes the sensor values to refine and/or adjust certain display parameters for visual content that is displayed on display device 116. For example, image properties of the light 122 emitted by display device 116 during display of known image(s) may be analyzed to determine color saturation levels of display device 116 for one or more colors included in displayed image(s).

Figure 2:
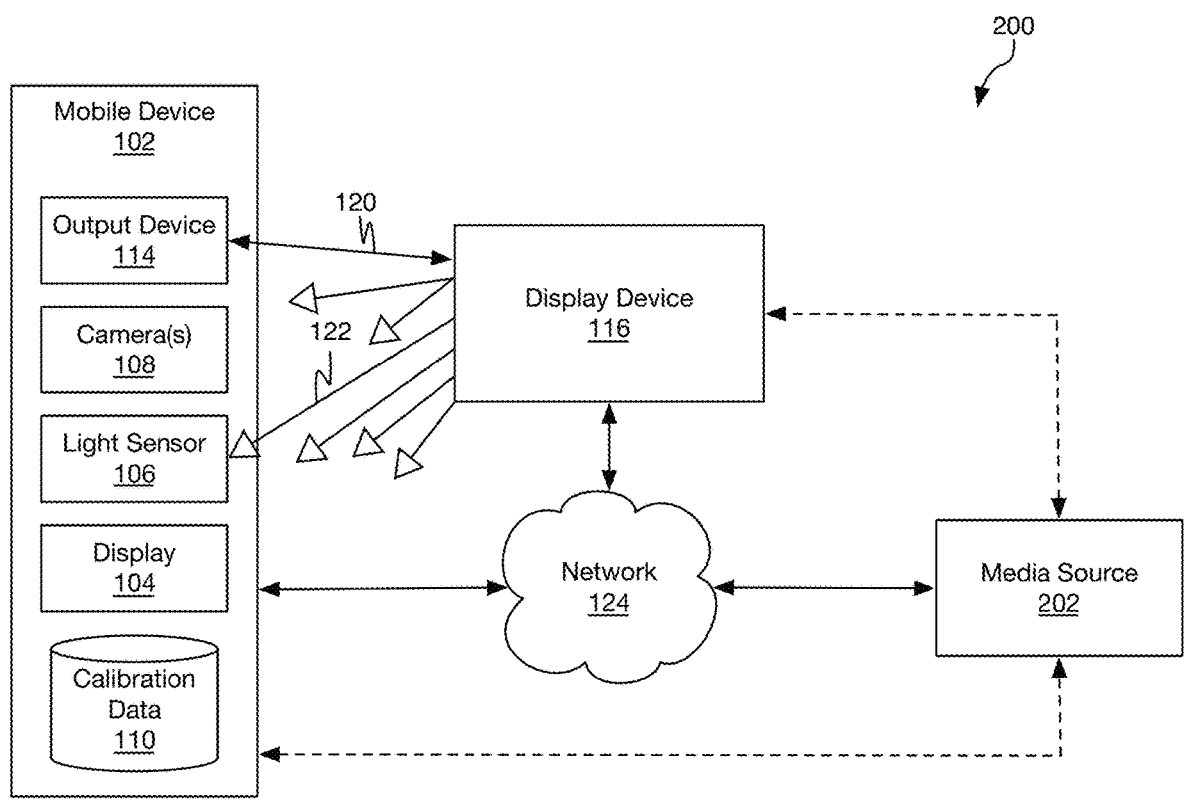
FIG. 2 is a block diagram of yet another example system for adjusting an output signal to a display device.

FIG. 2 is a block diagram of another example system for adjusting an output signal to a display device. In this embodiment, mobile device 102 includes an output device 114 for providing visual content from media source 202 to display device 116. Although media source 202 is shown being connected via network 124 to mobile device 102, any type of connection or communication channel made be used, with or without the aid of a network, such as via a direct connection.

In this embodiment, mobile device 102 transmits an output signal 120 to display device 116 for display thereon. Output signal 120 may be based, at least in part, on the visual content received from media source 202 in an approach. Upon display of the output signal 120 on display device 116, mobile device 102 may utilize light sensor 106 to measure properties of light 122 emitted from display device 116. Display device 116 may receive an output signal 120 from mobile device 102 (or some other source, such as directly from media source 202). In one approach, to perform a calibration procedure described in more detail herein, output signal 120 may include one or more known color and/or light presentations. Display device 116, upon receiving such presentation(s), projects the presentation(s), and mobile device 102, via light sensor 106, obtains sensor values related to the light 122 emitted by the display device 116 during the presentation(s).

In an embodiment, mobile device 102 analyzes the sensor values to refine and/or adjust certain display parameters for output signal 120. For example, image properties of the light 122 emitted by display device 116 during display of known image(s) may be analyzed to determine color saturation levels of display device 116 for one or more colors included in displayed image(s).

In an embodiment, sensor values obtained by mobile device 102 may be sent to any device in system 200. Some example devices include display device 116, media source 202, a media device (not shown), etc. The mobile device may package and/or arrange the sensor values prior to transmission in an approach. The sensor values, once received, may be used to adjust displayed visual content on display device 116. In one embodiment, the sensor values may be used to adjust a signal that media source 202 provides to display device 116. In another embodiment, the sensor values may be used to adjust a signal that mobile device 102 provides to display device 116. According to another embodiment, the sensor values may be used to adjust a signal that media source 202 provides to mobile device 102. In yet another embodiment, the sensor values may be used, by the display device, to adjust its own output. The adjustments may be made to achieve a desired standard of light 122 emitted by display device 116.

In an approach, a series of images may be displayed on display device 116, and sensor values relating to image properties of each image may be obtained by light sensor 106 and analyzed to adjust and/or refine device settings for output signal 120.

In one embodiment, a substantially pure white image may be displayed by display device 116, the white image being configured for testing the white output of display device 116 when displaying output signal 120. Light sensor 106 obtains sensor values for one or more image properties corresponding to the pure white image, and these sensor values may be used to adjust a property of output signal 120, which will cause an adjustment to light displayed by display device 116. In an approach, the sensor values may be used to refine a white point of output signal 120 from mobile device 102 to display device 116. The white point may be refined to more closely match a selected standard white color, such as D65, D70, etc.

FIGS. 3A-3E show example methods for aligning a light sensor 106 relative to a preferred location 306 of a display device 116. Positioning instructions may be used for aligning light sensor 106 of mobile device 102 with preferred location 306 of display device 116 to achieve best results for measuring properties of light emitted from a screen 300 of display device 116. Preferred location 306 may be a center of screen 300 of display device 116 in one embodiment. A central position eliminates or reduces any effects that edges of screen 300 may have on light emitted by screen 300, to ensure an optimal reading of light output by screen 300 of display device 116 is able to be measured by light sensor 106. However, any other preferred location may be used for aligning light sensor 106 relative to screen 300.

In some embodiments, more than one preferred location 306 may be used during the calibration procedure, each preferred location 306 being used individually to obtain light sensor measurements at each of the multiple preferred locations 306. In these embodiments, positioning information is provided via mobile device 102 and/or display device 116 in order to ensure proper orientation and positioning of light sensor 106 for each of the multiple preferred locations 306 prior to obtaining sensor readings at each of the multiple preferred locations 306.

As shown, mobile device 102 includes light sensor 106 on a same side 302 of mobile device 102 as display 104 and near an upper portion of display 104. However, light sensor 106 may be positioned anywhere on mobile device 102, e.g., above display 104, below display 104, on a side of display 104, embedded within a portion of display 104, etc. Moreover, light sensor 106 may be positioned on a different side of mobile device 102 than display 104. In other embodiments, multiple light sensors 106 and/or displays 104 may be present on mobile device.

To cause a user to properly position mobile device 102 to align light sensor 106 with preferred location 306, positioning instructions are provided by mobile device 102 and/or display device 116 to instruct the user how to move, flip, tilt, and/or position mobile device 102 to achieve proper alignment.

In one embodiment, in response to detecting that mobile device 102 is not positioned properly to align light sensor 106 with preferred location 306, non-visual positioning instructions may be provided to the user of the mobile device 102. These non-visual positioning instructions may include, but are not limited to, audio signals, haptic signals, tactile signals, etc. For example, the user may be given instructions to align mobile device 102 with preferred location 306. When the user moves mobile device 102 to the correct calibration position (e.g., in front of preferred location 306 at a correct distance from the display screen 300), mobile device 102 may cause vibration or some other tactile or haptic signal to eb produced, thereby indicating the correct alignment of the mobile device 102 relative to preferred location 306.

In another embodiment, alone or in combination with non-verbal positioning instructions, visual instructions may be provided to the user. These visual instructions may include, but are not limited to, text, graphics, images, videos, a single light source, multiple light sources working in conjunction, etc. The visual instructions instruct the user how to move and position light sensor 106 to achieve better measurements of light emitted by screen 300 of display device 116. The visual instructions may be provided, alone or in combination, by display 104 on mobile device 102, display device 116, media device 112, one or more lights separate from display 104 on mobile device 102, etc.

In one example, text instructing the user to move, rotate, flip, tilt, or otherwise re-position mobile device 102 may be displayed on screen 300 of display device 116 and/or on display 104 of mobile device 102 to cause the user to align light sensor 106 with preferred location 306 on screen 300.

In another example, a light array capable of producing multiple colors and patterns of light on mobile device 102 may show a flashing light which increases (or decreases) in frequency as light sensor 106 is moved closer to (or farther away from) preferred location 306.

According to another example, mobile device 102 may vibrate in a pattern that increases (or decreases) in frequency and/or intensity as light sensor 106 is moved closer to (or farther away from) preferred location 306.

In yet another example, mobile device 102 may vibrate continuously with an intensity that increases (or decreases) as light sensor 106 is moved closer to (or farther away from) preferred location 306.

According to one example, mobile device 102 may output audio signals in a pattern or continuously that increase (or decrease) in frequency and/or intensity as light sensor 106 is moved closer to (or farther away from) preferred location 306.

In another example, mobile device 102, display device 116, and/or media device 112 may output verbal instructions via one or more speakers that instruct the user how to move, position, tilt, rotate, and/or flip mobile device 102 (and therefore light sensor 106 included therein) to properly position light sensor 106 with preferred location 306, a preferred tilt and rotation angle relative to screen 300, and with a preferred proximity to screen 300 of display device 116.

Figure 3A:
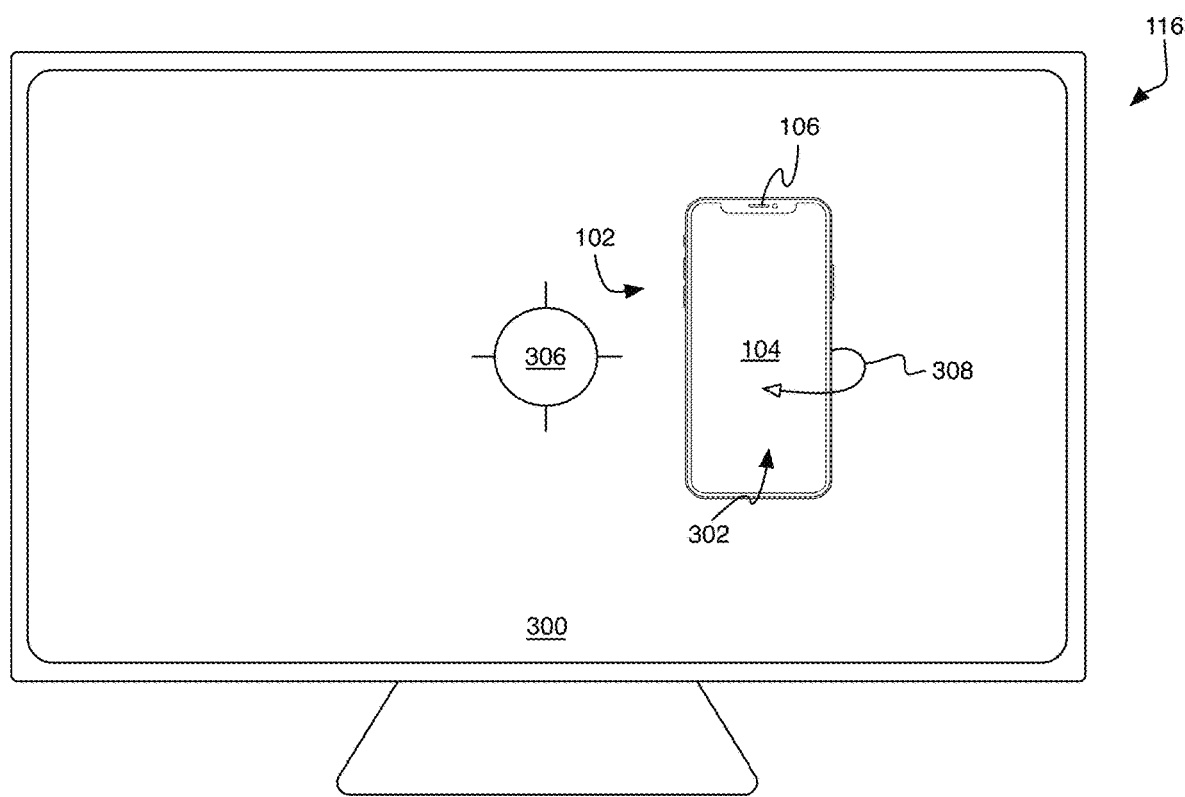
FIGS. 3A-3E show example methods for aligning a light sensor relative to a preferred location of a display device.

FIG. 3A shows mobile device 102 positioned such that light sensor 106 is facing away from screen 300 of mobile device 116. In one approach, positioning instructions 308 may direct the user to flip mobile device 102 over such that the side 302 of mobile device 102 on which light sensor 106 is positioned will be proximate to screen 300 of display device 116 (e.g., face and be located closer than an opposite side). These positioning instructions 308 may be provided in response to detecting that light sensor 106 is not directed toward screen 300 of display device 116. Such a determination may be made using input from light sensor 106, camera 108, a camera of display device 116, or some other suitable device that is able to interpret a position of light sensor 106.

Figure 3B:
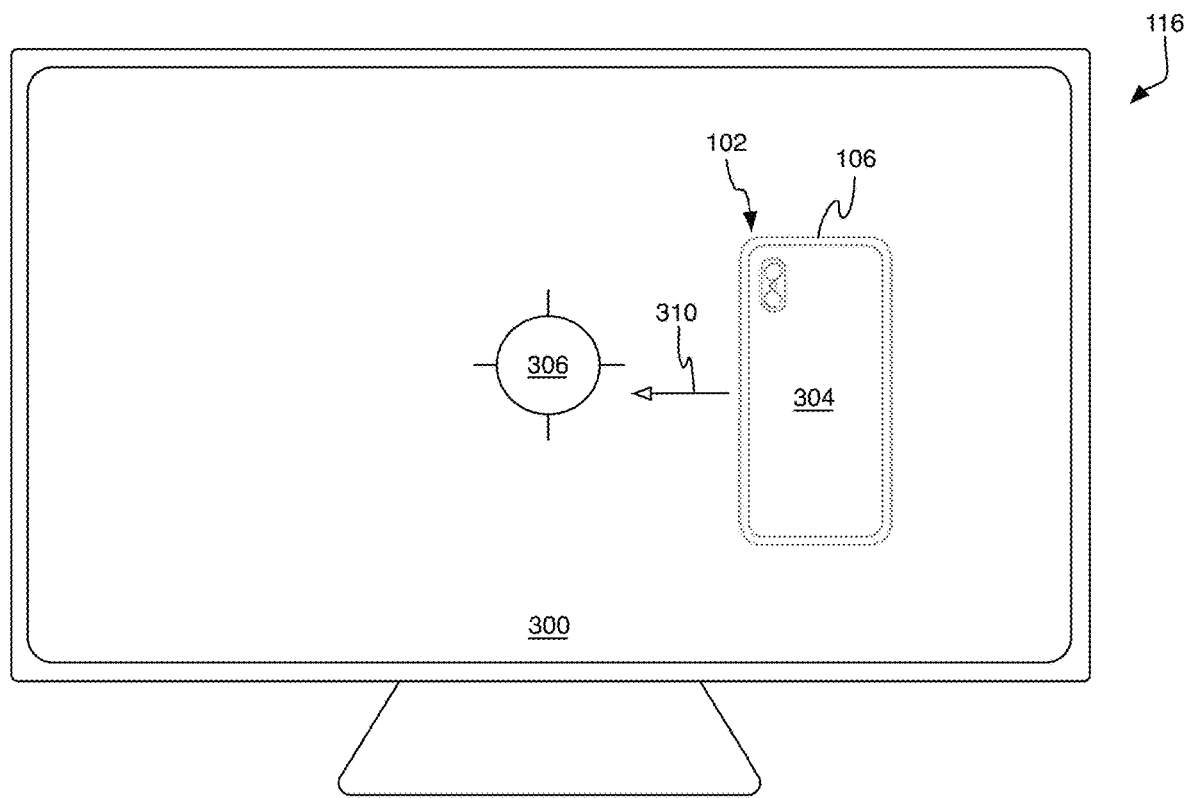

FIG. 3B shows positioning instructions 310 directing the user to move mobile device 102 left relative to screen 300 of display device 116, in an approach, depending on a detected location of light sensor 106 relative to preferred location 306. As shown, light sensor 106 is positioned on a side of mobile device 102 that faces screen 300 of display device 116 (exposing back side 304 of mobile device 102) and is positioned to a right of preferred location 306. Therefore, positioning instructions 310 will direct the user to move mobile device 102 (and therefore light sensor 106) to the left relative to display device 116. In another example, if light sensor 106 is positioned to the left of preferred location 306, then the positioning instructions would direct the user to move mobile device 102 (and therefore light sensor 106) to the right relative to display device 116.

Figure 3C:
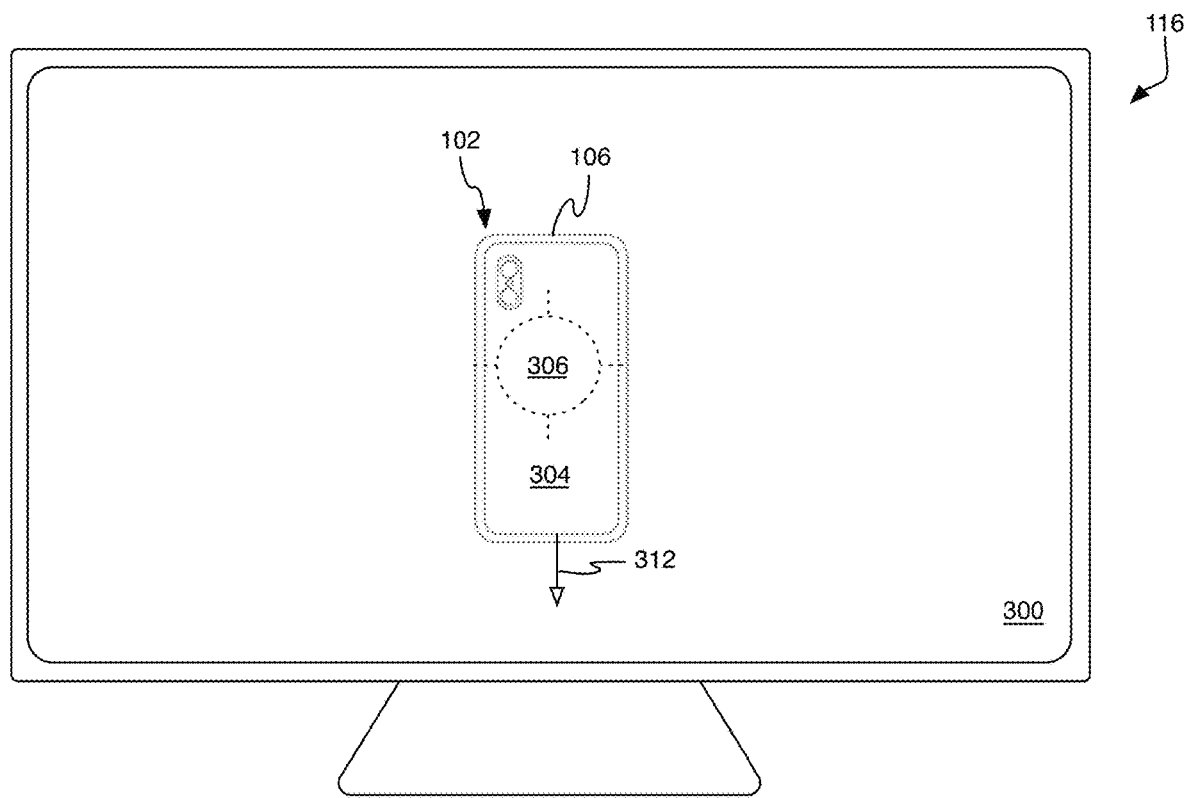

FIG. 3C shows positioning instructions 312 directing the user to move mobile device 102 downward relative to screen 300 of display device 116, in an approach, depending on a detected location of light sensor 106 relative to preferred location 306 (which is shown positioned behind mobile device 102). As shown, light sensor 106 is positioned above preferred location 306 and facing screen 300 of display device 116 (exposing back side 304 of mobile device 102). Therefore, positioning instructions 312 will direct the user to move mobile device 102 (and therefore light sensor 106) downward relative to display device 116. In another example, if light sensor 106 is positioned below preferred location 306, then the positioning instructions would direct the user to move mobile device 102 (and therefore light sensor 106) upward relative to display device 116.

Figure 3D:
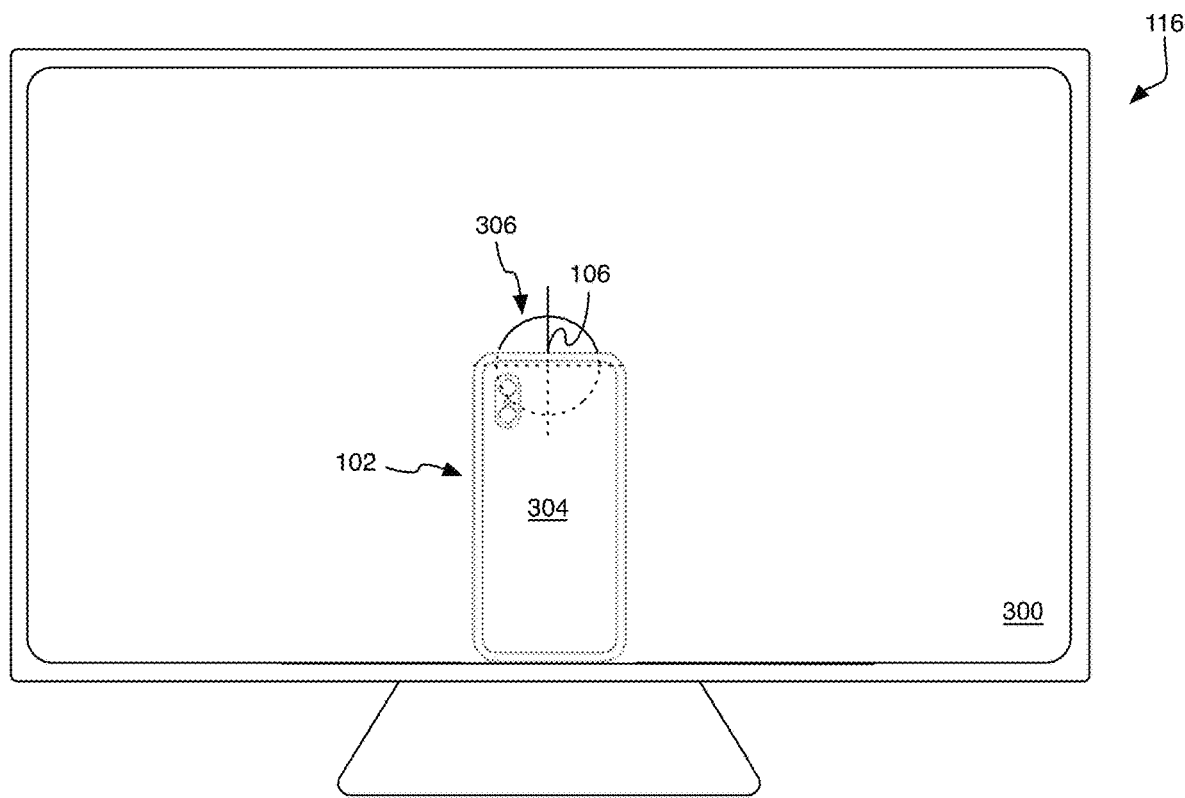

FIG. 3D shows light sensor 106 positioned appropriately with respect to preferred location 306 on screen 300 of display device 116. However, there may still be issues with how far light sensor 106 is positioned from screen 300, with how mobile device is tilted relative to screen 300, and/or with a rotation angle of mobile device 102 relative to screen 300. These issues may also be corrected with positioning instructions provided by mobile device 102, display device 116, and/or media device 112 in various approaches.

Figure 3E:
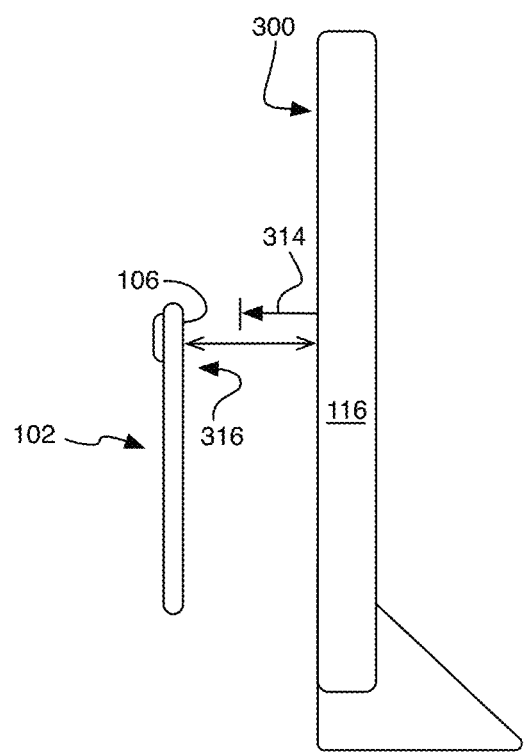

FIG. 3E shows a side view of mobile device 102 relative to screen 300 of display device 116. From this view, a distance between light sensor 106 and screen 300 is visible. In an approach, positioning instructions may direct the user to move mobile device 102 to a preferred distance 314 from screen 300 of display device 116. In several examples, the preferred distance 314 may be from 0.1 inch to 3 inches, such as 0.5 inch, 1 inch, 1.5 inch, 2 inches, etc. The distance between light sensor 106 and screen 300 of the display device 116 may be determined using input from a proximity sensor 316 in an embodiment. The mobile device 102 (or some other device such as display device 116) may comprise proximity sensor 316.

In an approach, positioning instructions may direct the user to move mobile device 102 (having light sensor 106) closer or farther away relative to screen 300 of display device 116 in order to capture an appropriate amount and intensity of light emitted from display device 116 to be measured by light sensor 106. In another approach, positioning instructions may direct the user to rotate and/or tilt mobile device 102 (having light sensor 106) relative to screen 300 of display device 116 in order to achieve an appropriate percentage of light emitted from display device 116 available to be measured by light sensor 106.

The determination of how to move, rotate, and/or tilt mobile device 102 may be based on measurements of light obtained by light sensor 106, proximity sensor 316, and/or camera 108, in various approaches. Mobile device 102 and/or media device 112 may analyze sensor readings obtained by light sensor 106 in order to determine whether the sensor readings are taken in a manner consistent with standards set for properly measuring properties of light. These conditions may include distance from the source, angle of the light sensor to the source, alignment of the light sensor with an optimal spot on the light source for measuring the light output, etc.

FIGS. 4A-4E show examples of guidance for enabling accurate positioning of a light sensor over a preferred location 306 of display device 116. The guidance may be displayed on the screen of display device 116. In one embodiment, the guidance is visible to a user of the mobile device and guides the user toward proper positioning of the light sensor over preferred location 306 to obtain sensor readings from light emitted by display device 116.

In an alternate embodiment, the guidance is not perceptible to a user of the mobile device and instead is detectible by the camera, light sensor, or some other sensor of the mobile device. This guidance is then interpreted by the mobile device and positioning information is relayed to the user based on analysis of the imperceptible guidance. The guidance may be embedded in a substantially solid color or background on the display device 116, with subtle inlaid shapes, lines, etc., providing guidance to the mobile device as to which direction to move in order to get closer to preferred location 306.

Figure 4A:
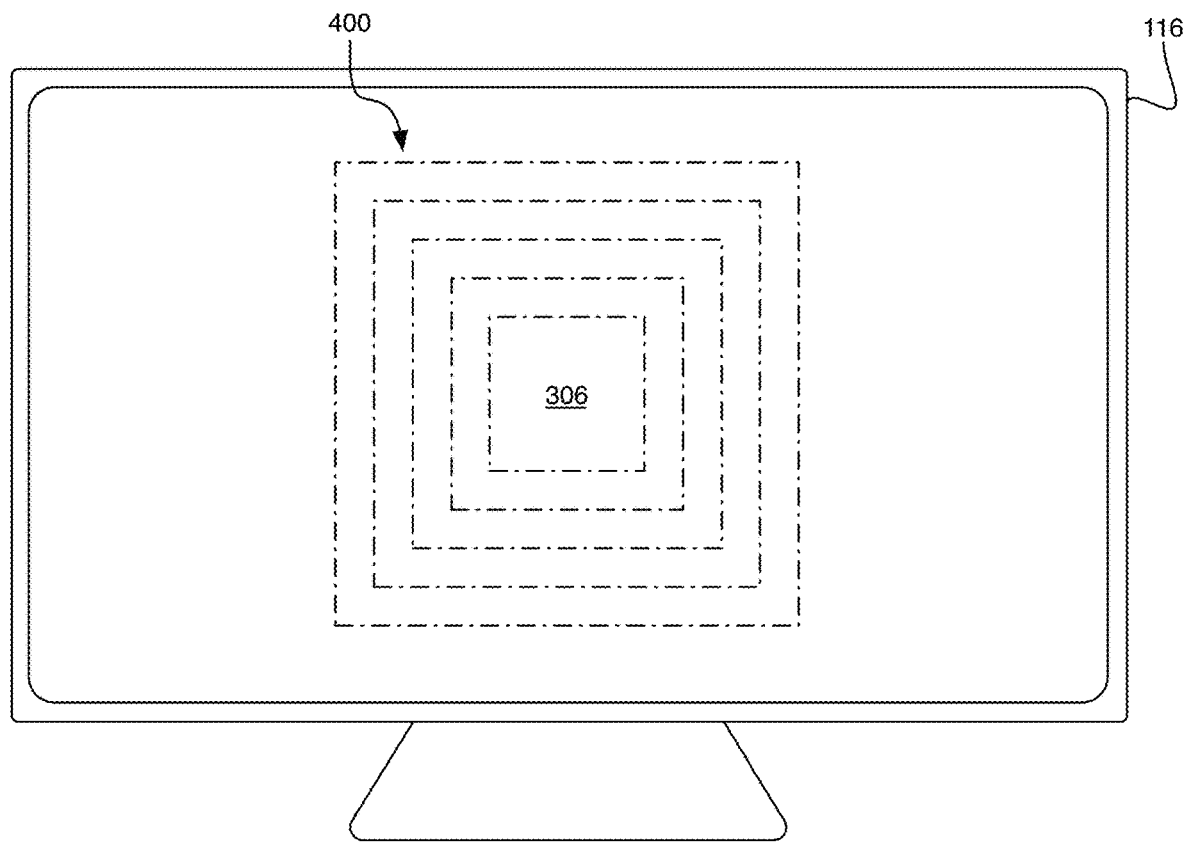
FIGS. 4A-4E show examples of guidance for enabling accurate positioning of a light sensor over a preferred location of display device.

FIG. 4A shows an example pattern 400 that shows a set of concentric shapes (here they are shown as rectangles or squares) that are centered on preferred location 306 of display device 116. In another embodiment, a rectangular or square spiral having one or more individual lines continuously drawing in toward preferred location 306 may guide the user to preferred location 306. According to an approach, the lines which form the concentric shapes in pattern 400 may pulse, flash, increase in thickness, decrease in thickness, change colors, or otherwise indicate closeness to preferred location 306.

Figure 4B:
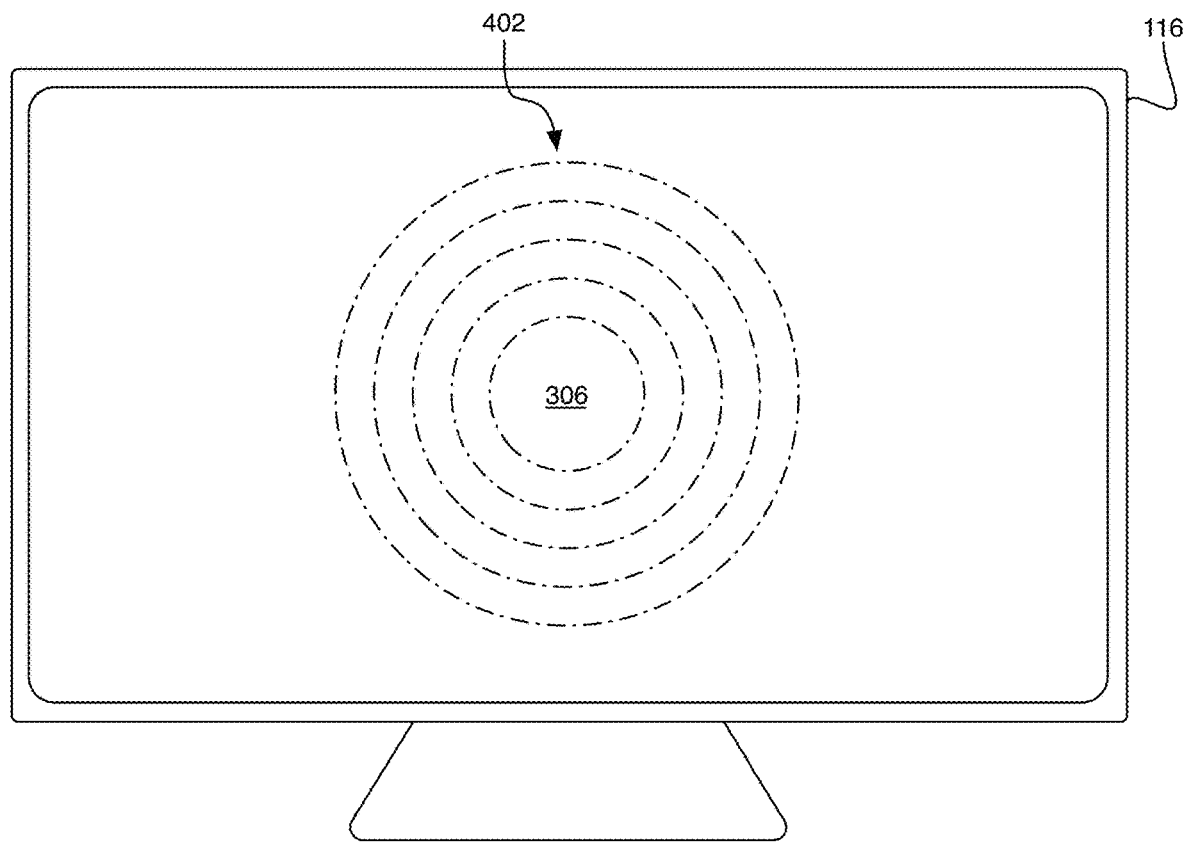

FIG. 4B shows an example pattern 402 that shows a set of concentric shapes (here they are shown as ovals or circles) that are centered on preferred location 306 of display device 116. In another embodiment, an oval or circular spiral having one or more individual lines continuously drawing in toward preferred location 306 may guide the user to preferred location 306. According to an approach, the lines which form the concentric shapes in pattern 402 may pulse, flash, increase in thickness, decrease in thickness, change colors, or otherwise indicate closeness to preferred location 306.

Figure 4C:
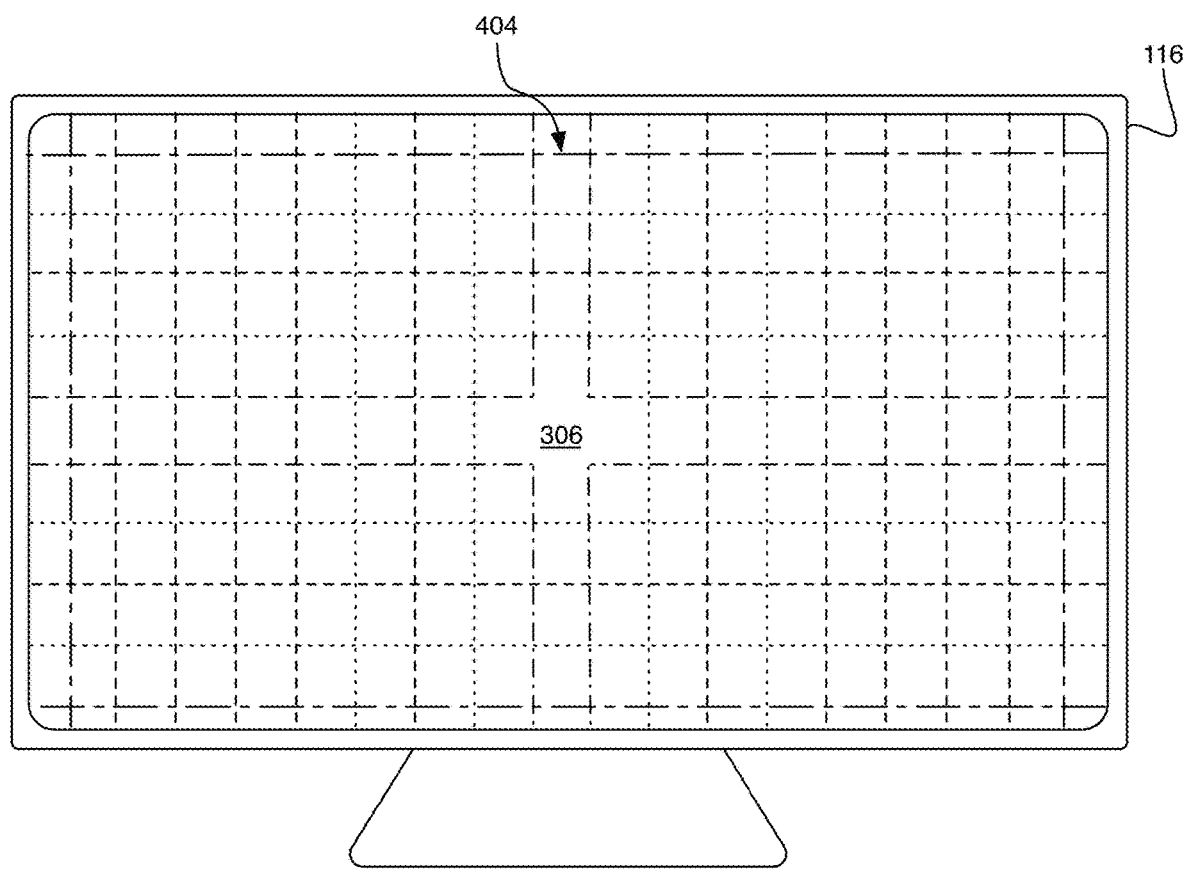

FIG. 4C shows an example pattern 404 that shows a grid of substantially straight lines that are centered on preferred location 306 of display device 116. In another embodiment, squares may be interwoven to form a grid pattern centered on preferred location 306. According to an approach, the lines which form the grid in pattern 404 may pulse, flash, increase in thickness, decrease in thickness, change colors, have different line styles (dashed, solid, etc.) or otherwise have differences to allow the user and/or the device to identify where preferred location 306 is positioned on the screen.

Figure 4D:
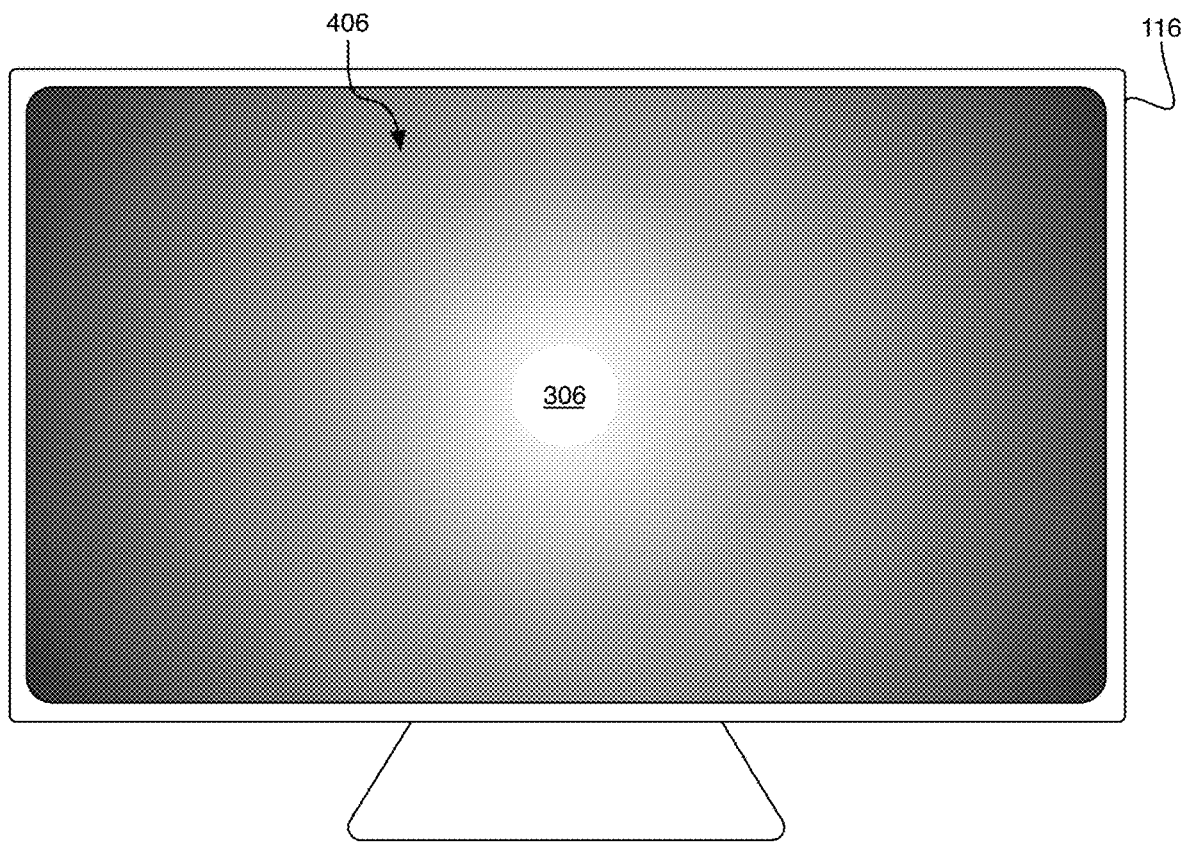

FIG. 4D shows an example pattern 406 that shows a gradient centered on preferred location 306 of display device 116. As shown, edges of the screen are darker than a center of the screen. In this approach, a color being tested may be presented at preferred location 306, while the remaining portions of display may be used to direct the user and/or the mobile device as to where preferred location 306 is positioned on the screen.

Figure 4E:
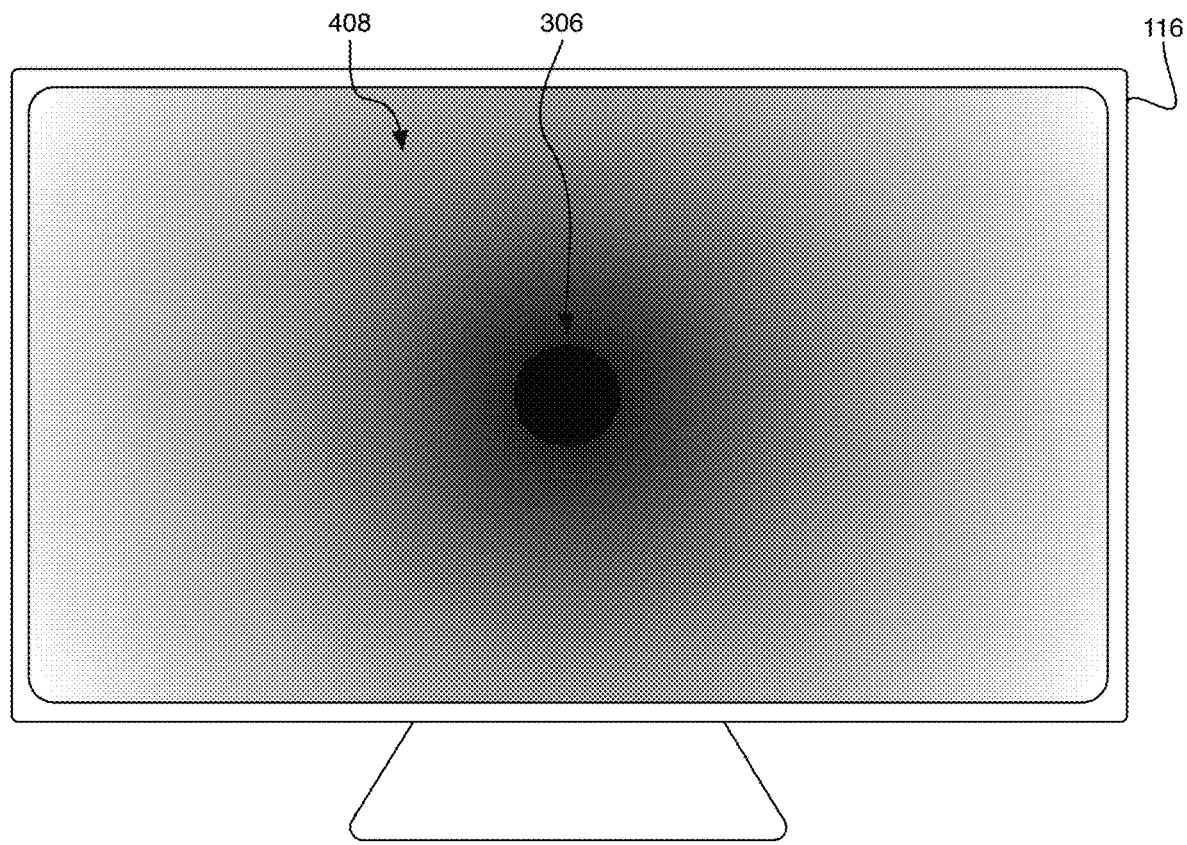

FIG. 4E shows an example pattern 408 that shows a gradient centered on preferred location 306 of display device 116. As shown, edges of the screen are lighter than a center of the screen. In this approach, a color being tested may be presented at preferred location 306, while the remaining portions of display may be used to direct the user and/or the mobile device as to where preferred location 306 is positioned on the screen.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
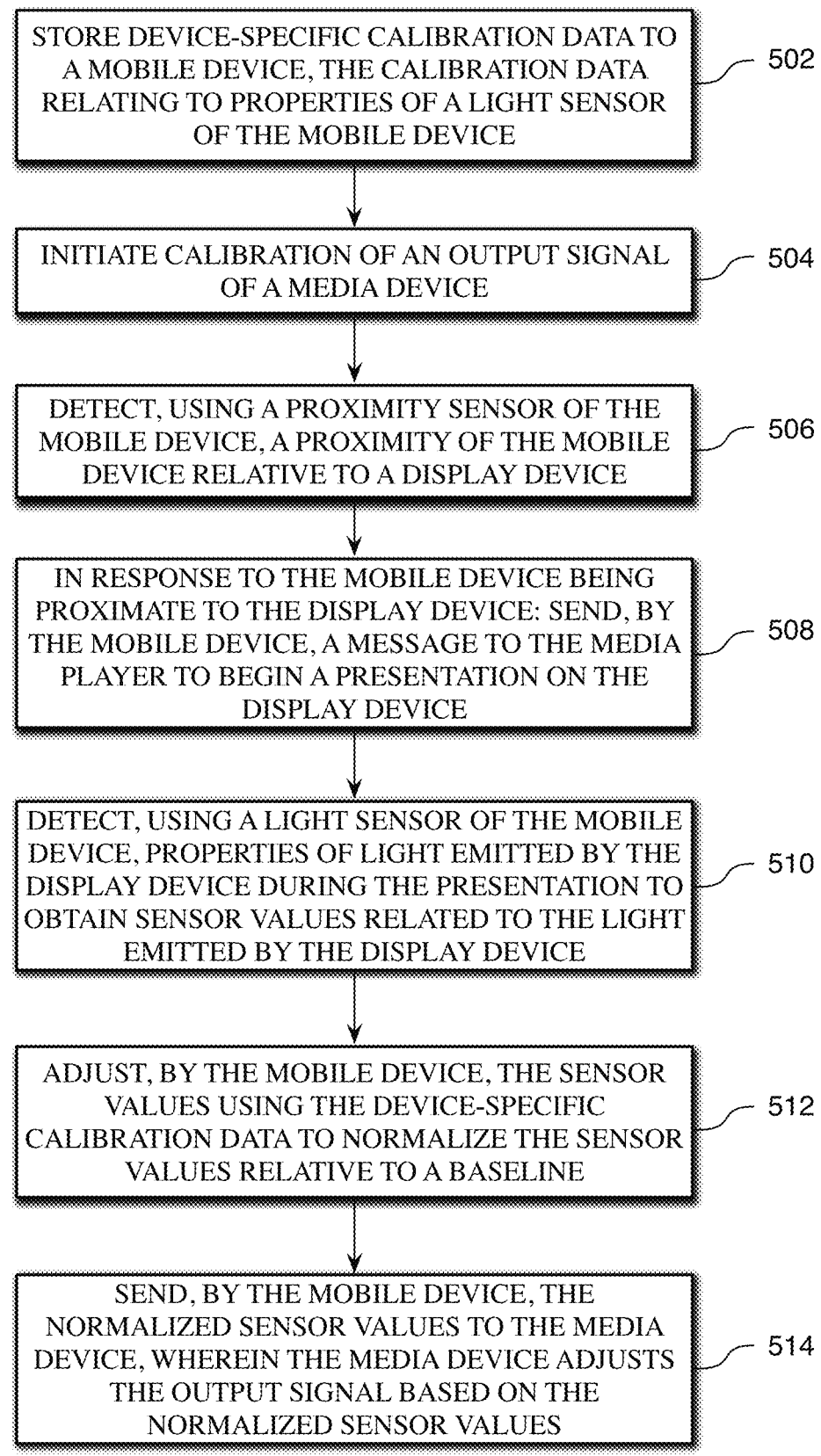
FIG. 5 is flow diagram of an example method for adjusting an output signal provided to a display device.

FIG. 5 is flow diagram of an example method 500 for adjusting an output signal provided to a display device. Method 500 may be performed by a mobile device, a media device, or some combination thereof.

At step 502, a mobile device stores device-specific calibration data to a memory of the mobile device. The calibration data relates to properties of a light sensor of the mobile device, such as indicating initial calibration conditions like lighting conditions during the calibration, standard used to calibrate the light sensor, when calibration was last performed, etc.

This device-specific calibration data may be used in a subsequent operation in order to normalize sensor readings taken by the light sensor when comparing them to sensor readings taken by other light sensors.

The device-specific calibration data may include settings and parameter values that have been set for the specific light sensor on the mobile device. The device-specific calibration data may be obtained prior to sale or acquisition of the mobile device originally, and/or at some later time before or after initial use by performing one or more calibration operations on the light sensor.

At step 504, the mobile device initiates calibration of an output signal of the media device. The calibration may be initiated by a trigger, such as user input, a condition or set of conditions being satisfied, etc. Initiation may be triggered at the mobile device, at the media device, cooperatively with the media device, via an exchange of information between one or more devices, etc.

At step 506, a proximity of the mobile device relative to the display device is detected using a proximity sensor of the mobile device (or some other suitable sensor or instrument). The proximity sensor may be positioned in a sensor array of the mobile device along with one or more additional sensors, such as one or more cameras, the light sensor, an accelerometer, etc.

At step 508, in response to the mobile device being proximate to the display device, the mobile device sends a message to the media player to begin a presentation on the display device. By proximate what is meant is that the mobile device has been positioned within a threshold distance or range of distances (e.g., at or near a desired distance) from a front of the display device.

Moreover, in some approaches, the mobile device being proximate to the display device may also indicate that the mobile device is positioned at a preferred location of the display device for measuring light output from the display device during the presentation.

At step 510, light sensor of the mobile device detects properties of light emitted by the display device during the presentation to obtain sensor values related to the light emitted by the display device. Some examples of light sensors include, but are not limited to, an ambient light sensor, optical light sensor, photodiode, photoresistor, photoelectric sensor, etc. The properties of light that are detected may include, but are not limited to, a quantity of light, saturation levels of certain colors of light (e.g., red, green, blue, white, etc.), intensity of light, etc.

In one embodiment, the light emitted by the display device during the presentation may include a spectrum of white light, e.g., the display device shows full white. This white color may be used to determine whether the display device is outputting light in accordance with a certain standard, such as D65, D70, etc.

In an approach, the light emitted by the display device during the presentation may include images that include one or more colors, such as a red light, a green light, and a blue light representative of an RGB color model. In this embodiment, the red, green, and blue lights are used to determine the composite colors of the RGB color model.

In one approach, the red light, the green light, and the blue light are displayed separately on the display device in a series of presentations, in order to allow separate sensor values to be obtained by the light sensor for each of the three colors. These separate sensor values may then be used to determine how each of the composite colors for the RGB color model are displayed on the display device, in order to determine how the output provided to the display device may be adjusted to better match a desired standard once displayed by the display device.

In another approach, the red light, the green light, and the blue light may be displayed in a single image. The single image may be static, in which the mobile device may be moved to capture sensor values for the different colors. The single image may include dynamic content, in which the individual colors may move to be positioned in front of the mobile device in a predetermined pattern or sequence that is interpreted by the mobile device to capture the individual sensor values.

According to an approach, an image comprising all white may be displayed such that the light sensor of the mobile device may acquire sensor values related to the white image, which may be used to adjust composite colors which combine to produce an all-white image. The all-white image may be displayed one or more times, in order to allow a signal provided to the display device to be adjusted to alter the appearance of the all-white image when displayed.

In another embodiment, several different colors may be displayed in a single image. This single image may be static, or may include dynamic content that moves or presents the various different colors in the image at different positions across the screen in a predetermined pattern or movement sequence that is interpreted by the light sensor of the mobile device. In this way, the mobile device may accumulate sensor values for each of the different colors individually during the presentation.

According to another approach, several different colors may be displayed in a series of images on the display, with the sensor values being determined for each color image. This process may be repeated one or more times to allow for adjusting an all-white image as displayed by the display device. The all-white image may also have sensor values determined therefor in order to ascertain whether adjustments made to one or more composite colors that together form the all-white image have improved or deteriorated the all-white image.

At step 512, the mobile device adjusts the sensor values using the device-specific calibration data to normalize the sensor values relative to a baseline. The baseline may be common to one or more other devices included in this calibration process, such as the media device, other mobile devices that may be used to measure light from the display device, etc.

The normalization may rely on xyz data set mapping of the device-specific calibration data in an approach. In another approach, the sensor values may be adjusted by weighting the sensor values in accordance with the device-specific calibration data (e.g., enhancing and/or minimizing the effect of one or more data points within the sensor values based on the device-specific calibration data) to achieve a set of data points that may be applied universally regardless of which specific light sensor obtained the sensor values.

At step 514, the mobile device sends the normalized sensor values to the media device. The media device may then utilize the normalized sensor values to adjust the output signal in order to achieve a standard for light output, such as a white point standard of D65, D70, etc. The output signal may be refined to ensure that it adheres to be within a certain percentage, absolute value, or some other measure of the selected standard. In one approach, a differential error may be used to measure a difference between the actual white point and the selected standard value, and this differential error may be minimized to be within about 1.5-3.0.

In a further approach, the light sensor of the mobile device may detect properties of light emitted by the display device during one or more additional presentations subsequent to adjusting the sensor values in order to produce refined sensor values relative to the baseline. This may be an iterative process that adjusts the output signal incrementally in a feedback loop (measuring each successive light presentation produced by the display device after adjusting the output signal provided to the display device based on sensor values obtained from each successive light presentation).

According to an approach, calibration of the media device (or some other secondary device which produces the output signal for display on the display device) may be initiated by the mobile device receiving a message broadcast from the media device (or the secondary device). Thereafter, the mobile device may display a notification on a display of the mobile device, the notification requesting participation in calibration of the media device. For example, the notification may include a button asking the user whether the mobile device may be involved in a calibration of the media device (or the secondary device), and upon selection of the button by the user, the calibration process may begin utilizing both devices. In the case where the mobile device produces the output signal to the display device, selection of the button may initiate the calibration of the mobile device output signal provided to the display device.

In a further approach, in response to receiving user input accepting participation in the calibration of the media device (such as selection of the button), the mobile device (or the display device) may display instructions to position the light sensor of the mobile device near the display device (e.g., at the preferred location and preferred distance from the screen of the display device). The instructions may be presented visually on one or more of the screens, or non-visually through the mobile device, the media device, etc., such as voice instructions, audio ques, haptic output, vibrational output, etc.

Figure 6:
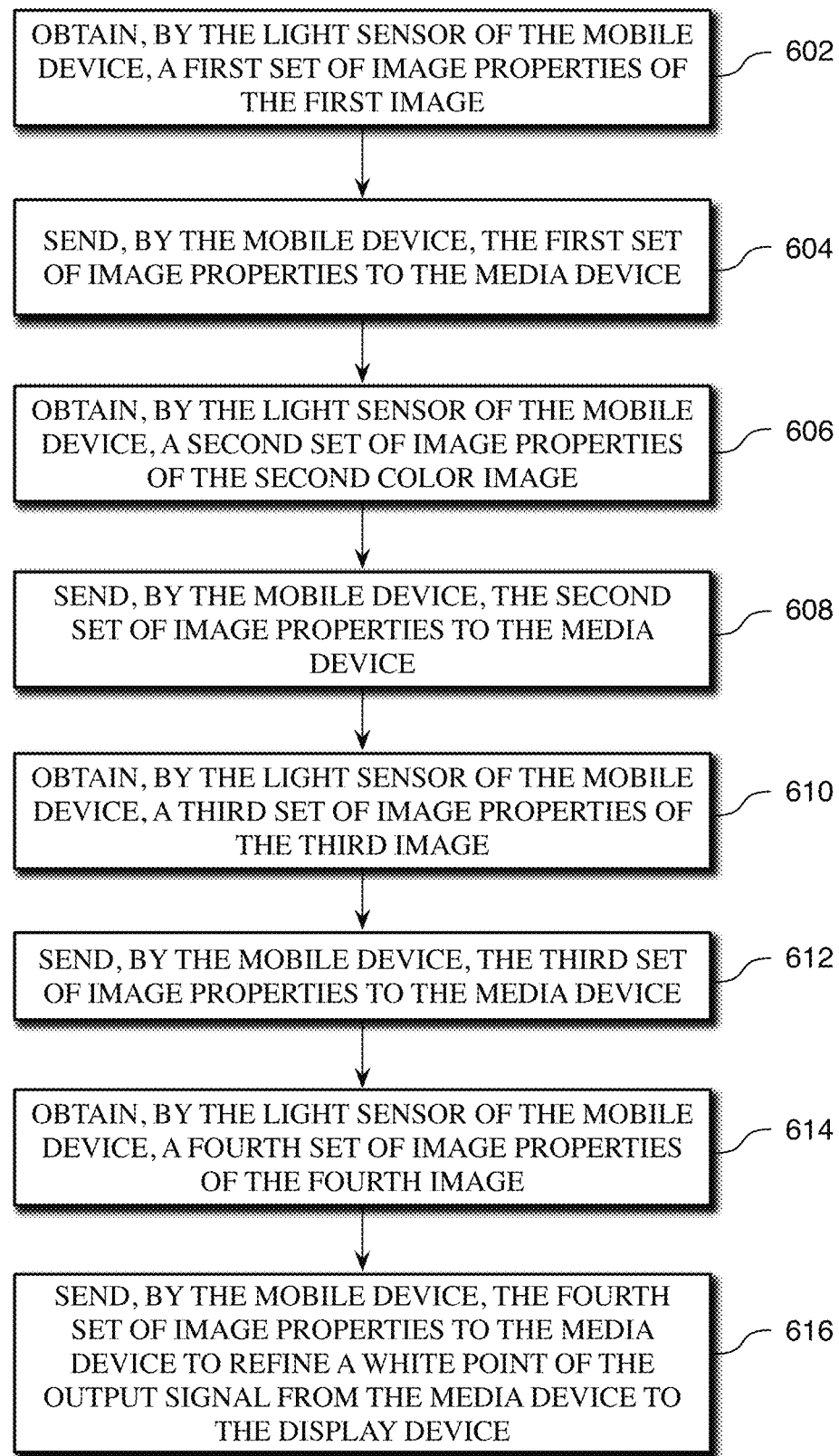
FIG. 6 is flow diagram of an example method for detecting properties of light emitted by a display device.

FIG. 6 is flow diagram of an example method 600 for detecting properties of light emitted by a display device in response to receiving an output signal. Method 600 may be performed by a mobile device, a media device, and/or a combination thereof.

Although method 600 describes obtaining image properties for three separate color images reproduced by the display device, any number of individual colors may be used to detect properties of light emitted by the display device, such as a single color image (e.g., all-white), or more or less separate images than three. Moreover, one or more different colors may be displayed simultaneously on the display device, and individual image properties for each of the displayed colors may be captured from the single image. The single image may be static or include dynamic content for displaying the various colors in a pattern or sequence that is interpreted, e.g., by a mobile device comprising the light sensor.

At step 602, a first set of image properties of a first color image reproduced by the display device are obtained (e.g., detected, measured, sensed, and/or acquired) by a light sensor. A particular device, like a mobile device, may comprise the light sensor in one embodiment. The first set of image properties may include sensor readings from the light sensor (e.g., an ambient light sensor, camera, etc.) that indicate measured characteristics of light emitted by the display device while displaying the first color image. Each color image displayed includes a substantially solid and pure color, such as white, red, green, blue, yellow, cyan, magenta, etc., in order to determine properties of that color as it is displayed by the display device.

In the case where the light sensor is positioned on the same side of the mobile device as a display, the display is turned off prior to obtaining the image properties in order to avoid light contamination from the mobile device's display adversely affecting the calibration procedure.

At step 604, the mobile device sends the first set of image properties to a device capable of analyzing the image properties. In other approach, a device which comprises the light sensor may send the image properties, and/or one or more intermediary devices may be used to relay the image properties. Some example devices that may receive the image properties include the media device, the mobile device, or some other device configured to analyze the image properties and use the generated information to calibrate an output signal to the display device.

At step 606, the light sensor (e.g., the mobile device) obtains a second set of image properties of a second color image reproduced on the display device. The second set of image properties may include sensor readings from the light sensor that indicate measured characteristics of light emitted by the display device while displaying the second color image.

At step 608, the mobile device sends the second set of image properties to the device capable of analyzing the image properties, e.g., the media device. Some example devices include the media device and the mobile device.

At step 610, the light sensor (e.g., the mobile device) obtains a third set of image properties of a third color image reproduced on the display device. The third set of image properties may include sensor readings from the light sensor that indicate measured characteristics of light emitted by the display device while displaying the third color image.

At step 612, the mobile device sends the third set of image properties to the device capable of analyzing the image properties. Some example devices include the media device and the mobile device.

In an approach, each of the first, second, and third color images may show a unique additive primary color of an additive color model, e.g., RGB color model, hue, saturation, and luminosity (HSL) color model, or others. The individual colors of the additive color model may be shown in any order. For example, for an RGB color model, red may be shown first, green next, and blue last. In another example, blue may be shown first, red second, and green last. Of course, any other order is possible and will provide the same image properties of each individually shown color. Moreover, when using an additive color model, the fourth color image may display pure white to enable analysis of the white output signal.

For example, for an RGB color model, the first color image may show pure red, and the first set of image properties may include a measure of a saturation level for red in the first color image. Furthermore, the second color image may show pure blue, and the second set of image properties may include a measure of a saturation level for blue in the second color image. Also, the third color image may show pure green, and the third set of image properties may include a measure of a saturation level for green in the third color image.

At step 614, the mobile device obtains a fourth set of image properties of a fourth color image reproduced on the display device, e.g., using the light sensor. In an approach, the fourth image is generated based in part on the first, second, and third sets of image properties that have been returned to the device and analyzed to determine modifications to the output signal provided to the display device. The fourth set of image properties may include sensor readings from the light sensor that indicate measured characteristics of light emitted by the display device while displaying the fourth color image.

At step 616, the mobile device sends the fourth set of image properties to the device capable of analyzing the image properties. Some example devices include the media device and the mobile device. The fourth set of image properties may be used to refine a white point of the output signal provided to the display device. In other approaches, different aspects of the output signal may be refined using the fourth set of image properties, such as saturation levels of specific colors, color profile being used, native color space being used, etc.

In one approach, one or more additional sets of image properties of one or more additional color images reproduced on the display device may be obtained by the mobile device using the light sensor. These additional sets of image properties may be obtained responsive to sending the fourth set of image properties. The one or more additional color images are generated based in part on the fourth and each successive set of image properties to further refine characteristics of the output signal provided to the display device. Thereafter, the mobile device sends the one or more additional sets of image properties to a device capable of analyzing the image properties to further refine the white point of the output signal provided to the display device.

In an additional embodiment, prior to obtaining any of the sets of image properties, the mobile device may determine, using at least one camera, whether the mobile device (and therefore the light sensor) is positioned at a preferred location in front of the display device. Responsive to a determination that the mobile device is not positioned at the preferred location, the mobile device provides visual and/or non-visual positioning instructions to a user of the mobile device. The positioning instructions direct the user to move the mobile device toward the preferred location using any technique described herein.

In a further approach, responsive to providing the positioning instructions to the user, the mobile device may determine a movement direction of the mobile device, e.g., by using an accelerometer or some other suitable sensor, to determine whether the user is moving the mobile device according to the positioning instructions provided to the user. For example, if the user is directed to move the mobile device to the left, sensor data from the accelerometer may be used to verify that the mobile device is being moved to the left, and not in some other inappropriate direction away from the preferred location for taking light measurements. In addition, responsive to the user not moving the mobile device according to the positioning instructions, the mobile device may provide corrective positioning instructions to instruct the user to correct the movement direction of the mobile device to be toward the preferred location and not in some other undesirable direction.

Figure 7:
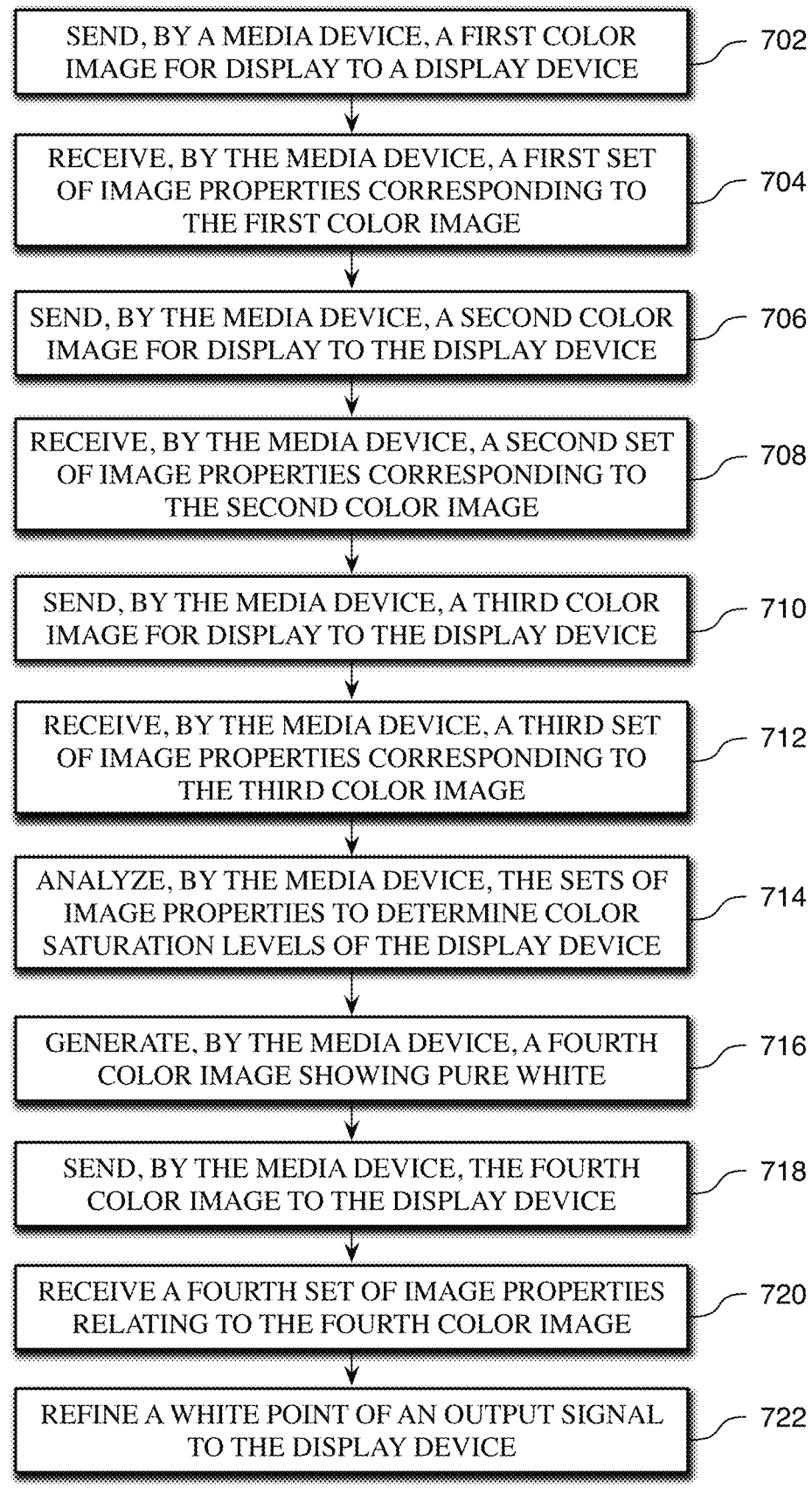
FIG. 7 is flow diagram of an example method for refining a white point of an output signal as displayed on a display device.

FIG. 7 is flow diagram of an example method 700 for refining a white point of an output signal as displayed on a display device. Method 700 may be performed by a mobile device, a media device, and/or a combination thereof.

Although method 700 describes obtaining image properties for three separate color images reproduced by the display device, any number of individual colors may be used to detect properties of light emitted by the display device, such as a single color image (e.g., all-white), or more or less separate images than three. Moreover, one or more different colors may be displayed simultaneously on the display device, and individual image properties for each of the displayed colors may be captured from the single image. The single image may be static or include dynamic content for displaying the various colors in a pattern or sequence that is interpreted, e.g., by a mobile device comprising the light sensor.

At step 702, a media device sends a first color image to a display device for display on the display device. In one example, the first color image shows pure red (or another color of an additive color model).

Each of the first, second, and third color images may show a unique additive primary color of an additive color model, e.g., RGB color model, in an approach.

At step 704, the media device receives a first set of image properties corresponding to the first color image. The image properties may be obtained by a light sensor of a secondary device, like a mobile device positioned in front of the display device.

At step 706, the media device sends a second color image for display to the display device. In one example, the second color image shows pure green (or another color of the additive color model not yet shown).

At step 708, the media device receives a second set of image properties corresponding to the second color image. The image properties may include any relevant information pertaining to how a color is displayed, such as hue, saturation, luminosity, etc.

At step 710, the media device sends a third color image for display to the display device. In one example, the third color image shows pure blue (or another color of the additive color model not yet shown).

At step 712, the media device receives a third set of image properties corresponding to the third color image. This process of sending color images and receiving image properties is repeated until all colors of the additive color model are displayed, individually, on the display device for taking measurements thereof.

At step 714, the media device analyzes the first, second, and third sets of image properties (and any additional sets of image properties for other colors) to determine, at a minimum, color saturation levels of the display device for the first, second, and third color images.

At step 716, the media device generates a fourth color image showing pure white based on, at least, the saturation levels of the display device for the first, second, and third color images.

At step 718, the media device sends the fourth color image for display to the display device. In one example, the fourth color image shows pure white, a full addition of all colors in the additive color model.

At step 720, the media device receives a fourth set of image properties corresponding to the fourth color image. The fourth set of image properties may include the same parameters measured for the other color images, or may include one or more different or additional image properties that enable analysis of the addition of all colors in the additive color model.

At step 722, the media device (or some other suitable device capable of analyzing the image properties) refines a white point of the output signal from the media device to the display device. The white point is refined based, at least, on the fourth set of image properties. The first, second, and/or third sets of image properties may also be considered when refining the white point.

In an embodiment, responsive to receiving the fourth set of image properties, the media device may generate a series of one or more additional color images. These additional color images may be used to further refine the white point of the output signal from the media device to the display device. In this embodiment, each of the additional color images shows pure white in order to allow for analysis of the properties of the white images. The media device sends the series of one or more additional color images for display individually on the display device and receives one or more additional sets of image properties to further refine the white point of the output signal from the media device. Each of the additional color images may be based, at least in part, on analysis of the fourth and each successive set of image properties. The analysis may be performed by the media device, the mobile device, a combination thereof, or any other device in the system capable of such analysis.

In one embodiment, a detectable signal in the first color image configured for determination of a position of the mobile device in front of the display device may be provided. The detectable signal may include a pattern, graphic(s), shape(s), or other guidance information reproduced in one or more of the color images in order to aid in alignment of the mobile device at a preferred position of the display device. The detectable signal may be visible to the user in one approach, or imperceptible to the user in another approach. When the detectable signal is imperceptible to the user, the mobile device is configured to determine the presence of the detectable signal and relay positioning information to the user based on the current position of the mobile device.

In one approach, analyzing the first, second, and third sets of image properties may include determination of settings for each unique additive primary color of an additive color model in order to set a white point of the output signal, from the media device, that is provided to the display device.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the output signal provided to a display device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve and/or refine the output signal of a media device or mobile device provided to a display device for display thereon. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services for refining the output signal of a media device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the output signal provided to the display device may be refined by inferring preferences based on non-personal information data or a bare minimum amount of personal information, such as the content being requested by the device associated with a user, other non-personal information available to the calibration services, or publicly available information.

Example System Architecture

Figure 8:
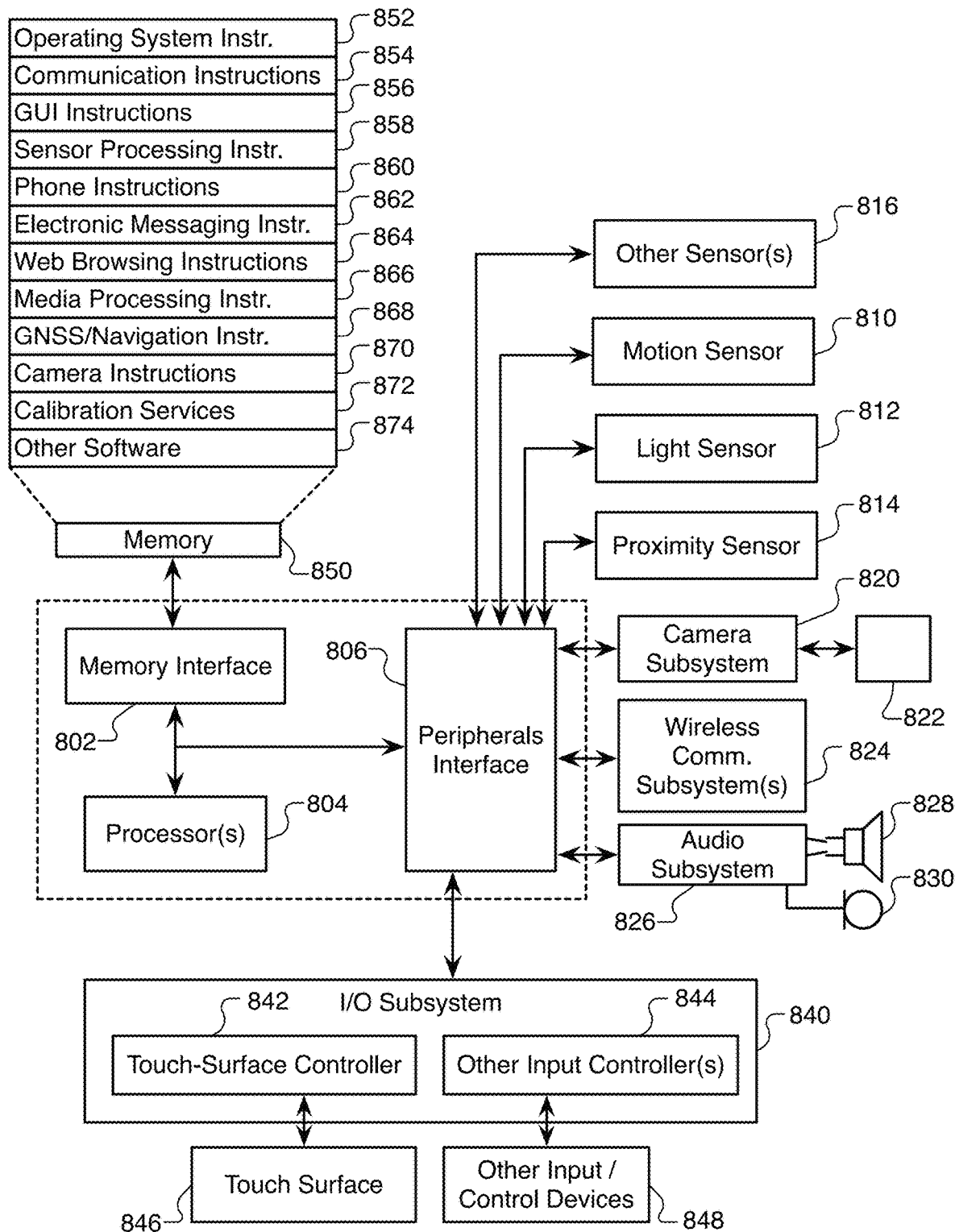
FIG. 8 is a block diagram of an example computing device that can implement the features and processes of FIGS. 1A-7.

FIG. 8 is a block diagram of an example computing device 800 that can implement the features and processes of FIGS. 1A-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing calibration of an output signal for display. For example, operating system 852 can implement the calibration features as described with reference to FIGS. 1A-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the calibration processes and functions as described with reference to FIGS. 1A-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method, comprising:
    causing display of a first image on a display device;
    receiving, by a particular device, a first set of properties corresponding to light emitted by the display device during the display of the first image by the display device;
    determining, by the particular device, an adjustment for an output signal, for a set of one or more images to be displayed on the display device, based at least on the first set of properties; and
    causing, by the particular device, adjustment of the output signal in accordance with the determined adjustment.

2. The method as recited in claim 1, further comprising:
    prior to determining the adjustment for the output signal:
        causing display of a second image on the display device; and
        receiving a second set of properties corresponding to light emitted by the display device during the display of the second image by the display device,
    wherein the adjustment for the output signal for the set of one or more images is based further on the second set of properties.

3. The method as recited in claim 1, further comprising adjusting a saturation level of one or more particular colors of light emitted by the display device.

4. The method as recited in claim 1, wherein the particular device is the display device.

5. The method as recited in claim 1, wherein the particular device is different from the display device.

6. The method as recited in claim 1, wherein the first set of properties corresponding to light emitted by the display device comprise a quantity of light and a saturation level of one or more particular colors of light.

7. The method as recited in claim 1, wherein causing display of the first image on the display device is subsequent to:
    broadcasting, by the particular device, a first message indicating initiation of the calibration of the output signal of the media device;
    receiving, by the particular device, a second message requesting display of the first image on the display device.

8. A non-transitory computer-readable medium including one or more sequences of instructions stored thereon that, when executed by one or more processors, cause the one or more processors to perform operations comprising:
    causing display of a first image on a display device;
    receiving, by a particular device, a first set of properties corresponding to light emitted by the display device during the display of the first image by the display device;
    determining, by the particular device, an adjustment for an output signal, for a set of one or more images to be displayed on the display device, based at least on the first set of properties; and
    causing, by the particular device, adjustment of the output signal in accordance with the determined adjustment.

9. The non-transitory computer-readable medium as recited in claim 8, wherein the operations further comprise:
    prior to determining the adjustment for the output signal:
        causing display of a second image on the display device; and
        receiving a second set of properties corresponding to light emitted by the display device during the display of the second image by the display device,
    wherein the adjustment for the output signal for the set of one or more images is based further on the second set of properties.

10. The non-transitory computer-readable medium as recited in claim 8, wherein the operations further comprise adjusting a saturation level of one or more particular colors of light emitted by the display device.

11. The non-transitory computer-readable medium as recited in claim 8, wherein the particular device is the display device.

12. The non-transitory computer-readable medium as recited in claim 8, wherein the particular device is different from the display device.

13. The non-transitory computer-readable medium as recited in claim 8, wherein the first set of properties corresponding to light emitted by the display device comprise a quantity of light and a saturation level of one or more particular colors of light.

14. The non-transitory computer-readable medium as recited in claim 8, wherein causing display of the first image on the display device is subsequent to:
    broadcasting, by the particular device, a first message indicating initiation of the calibration of the output signal of the media device;
    receiving, by the particular device, a second message requesting display of the first image on the display device.

15. A system, comprising:
    one or more processors; and
    a non-transitory computer-readable medium including one or more sequences of instructions stored thereon that, when executed by the one or more processors, cause the one or more processors to perform operations comprising:
        causing display of a first image on a display device;
        receiving, by a particular device, a first set of properties corresponding to light emitted by the display device during the display of the first image by the display device;
        determining, by the particular device, an adjustment for an output signal, for a set of one or more images to be displayed on the display device, based at least on the first set of properties; and causing, by the particular device, adjustment of the output signal in accordance with the determined adjustment.

16. The system as recited in claim 15, wherein the operations further comprise:
   prior to determining the adjustment for the output signal:
   causing display of a second image on the display device; and
   receiving a second set of properties corresponding to light emitted by the display device during the display of the second image by the display device,
   wherein the adjustment for the output signal for the set of one or more images is based further on the second set of properties.

17. The system as recited in claim 15, wherein the operations further comprise adjusting a saturation level of one or more particular colors of light emitted by the display device.

18. The system as recited in claim 15, wherein the particular device is the display device.

19. The system as recited in claim 15, wherein the first set of properties corresponding to light emitted by the display device comprise a quantity of light and a saturation level of one or more particular colors of light.

20. The system as recited in claim 15, wherein causing display of the first image on the display device is subsequent to:
   broadcasting, by the particular device, a first message indicating initiation of the calibration of the output signal of the media device;
   receiving, by the particular device, a second message requesting display of the first image on the display device.

* * * * *